Figure 1:
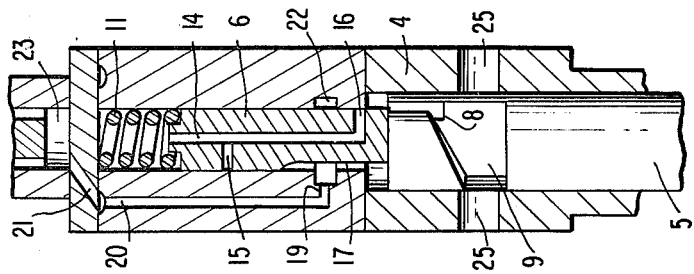
Figure 2:
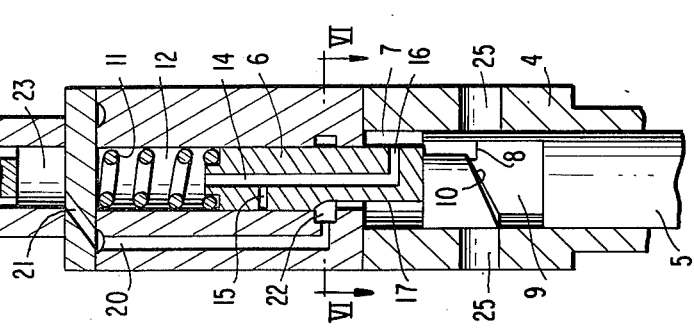
Figure 3:
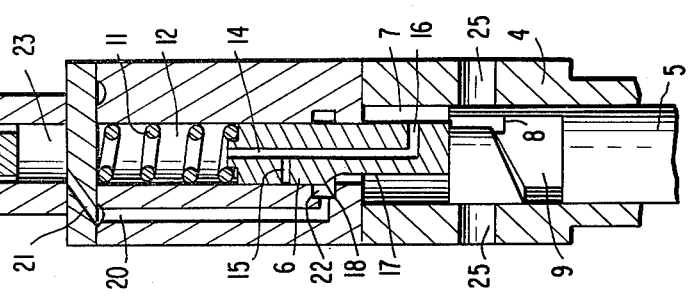

United States Patent [19]

Scheying

[11] 4,178,141
[45] Dec. 11, 1979

[54] FUEL INJECTION PUMP FOR AIR-COMPRESSING INJECTION INTERNAL COMBUSTION ENGINES

[75] Inventor: Heinz Scheying, Stuttgart, Fed. Rep. of Germany

[73] Assignee: Daimler-Benz Aktiengesellschaft, Fed. Rep. of Germany

[21] Appl. No.: 841,292

[22] Filed: Oct. 12, 1977

[30] Foreign Application Priority Data

Oct. 22, 1976 [DE] Fed. Rep. of Germany ....... 2647788

[51] Int. Cl.² .............................................. F04B 7/04
[52] U.S. Cl. .................................... 417/498; 417/510; 123/139 BE
[58] Field of Search ............... 417/498, 510, 487, 443, 417/457, 456; 123/139 AA, 139 BE

[56] References Cited

U.S. PATENT DOCUMENTS

| | | | |
|---|---|---|---|
| 1,944,919 | 1/1934 | Bischof | 417/498 |
| 2,958,289 | 11/1960 | Hafele | 417/492X |
| 3,068,793 | 12/1962 | Morris | 417/510 |
| 3,371,610 | 3/1968 | DeLuca et al. | 417/485 |

FOREIGN PATENT DOCUMENTS 195177 1/1958 Austria ..................................... 417/498
489505 1/1930 Fed. Rep. of Germany .......... 417/510

*Primary Examiner*—Carlton R. Croyle
*Assistant Examiner*—Leonard E. Smith
*Attorney, Agent, or Firm*—Craig and Antonelli

[57] ABSTRACT

A fuel injection pump for compressed air injected internal combustion engines with a pump piston and with a control slide valve member coaxially arranged to each other in a given pump cylinder, of which the pump piston controls a fuel control bore in the pump working space and actuates the control slide valve member which is under the force of a spring; the control slide valve member which rests continuously on the pump piston and possibly may be made in one piece therewith includes in its lower half facing the pump piston a recess, preferably rounded-off, that extends in the direction of movement of the control slide valve member and that terminates at a slight inclination in the direction of the outer circumference of the control slide valve member; a bore arrangement is provided in the housing part in which the control slide valve member is longitudinally displaceably guided by means of which the pump pressure space is connected with the pump working space alternately by way of a bore arrangement in the control slide valve member or by way of the recess.

16 Claims, 6 Drawing Figures

FUEL INJECTION PUMP FOR AIR-COMPRESSING INJECTION INTERNAL COMBUSTION ENGINES

The present invention relates to a fuel injection pump for compressed air injected internal combustion engines with a pump piston and with a control slide valve member mutually arranged coaxially in a respective pump cylinder of which the pump piston controlling a fuel control bore in the pump working space actuates the control slide valve member which is under the prestress of a spring, whereby the control slide valve member is provided with a bore arrangement, by way of which the pump working space is temporarily connected with the pump pressure space.

For directly injecting internal combustion engines, the arrangement of two pistons or of one piston as well as of a control slide valve member per pump cylinder of a fuel injection pump is provided for the most part for the reason so as to be able to control in this manner the feed developments and progresses more advantageously at least within a part of the entire load range.

It is generally known that, for example, with so-called throttle pin nozzles one can attain in compressed air injected internal combustion engines a soft combustion and therewith a quiet running of these internal combustion engines.

Throttle pin nozzles, however, cannot be utilized in all internal combustion engines. Thus, for example, with internal combustion engines having a direct injection, multi-aperture nozzles are provided. However, with such nozzles, the combustion noise is generally higher because an excessive fuel quantity is injected during the ignition delay.

It is the aim of the present invention to improve this behavior by special measures determining the feed progress at the fuel injection pump.

The underlying problems are solved according to the present invention in that the control slide valve member resting continuously on the piston pump, which possibly might be made in one piece with the piston pump, includes essentially in its lower half facing the pump piston, a recess extending in the movement direction of the control slide valve member, preferably a bevelling or rounding-off, which ends at a slight inclination in the direction of the outer circumference of the control slide valve member, and in that a bore arrangement is provided also in a housing part in which the control slide valve member is longitudinally displaceably guided, by means of which the pump pressure space is alternately connected with the pump working space by way of the first bore arrangement or by way of the recess.

As a result of the undertaken measures, initially little fuel is injected, as viewed over the entire load range, then at the end a large amount of fuel is injected under high pressure, whereby a smooth operation is assured also for the internal combustion engine subjected to frequent load changes, especially for motor vehicle internal combustion engines.

In a preferred embodiment of the present invention, the bore arrangement in the control slide valve member may consist of a longitudinal bore terminating in an intermediate space above the control slide valve member, of at least one feed bore leading to this longitudinal bore and in communication with the pump working space as well as of at least one control bore branching off from the longitudinal bore in the upper half of the control slide valve member and connected—in the lower dead-center position of the piston—with the bore arrangement in the housing part.

It is proposed as further feature of the present invention that at the latest after the closing of the control bore by the pump piston, the connection of pump pressure space/pump working space is interrupted by way of the bore arrangement in the control slide valve member and the feed beginning starts as soon as the bevelled or rounded-off portion reaches with its control edge the bore arrangement in the housing part.

Accordingly, it is an object of the present invention to provide a fuel injection pump for compressed air injected internal combustion engines which avoids by simple means the aforementioned shortcomings and drawbacks encountered in the prior art.

Another object of the present invention resides in a fuel injection pump for compressed air injected internal combustion engines which permits an improvement of the feed development by simple means.

A further object of the present invention resides in a fuel injection pump for compressed air injected internal combustion engines in which a soft combustion and a quiet running of the engine can be attained by an injection pump utilizing a simple structure.

A still further object of the present invention resides in a fuel injection pump of the type described above in which initially a relatively small quantity or quantities of fuel are injected while a larger amount of fuel is injected under high pressure during the end of the injection operation.

Still another object of the present invention resides in a fuel injection pump of the type described above which assures a smooth operation of the engine even though subjected to frequent load changes.

Figure 4:
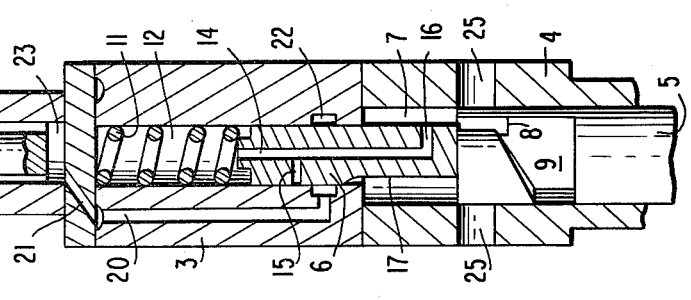
Figure 5:
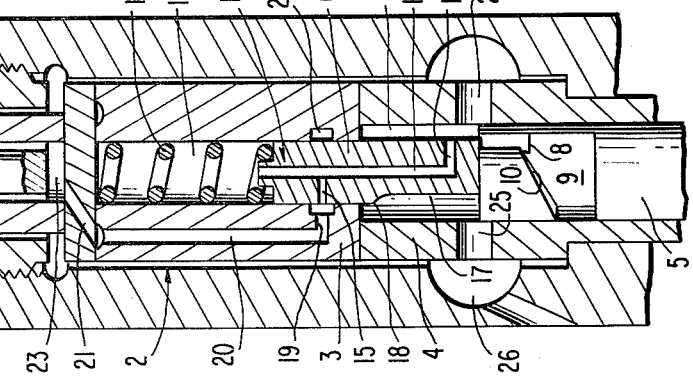
Figure 6:
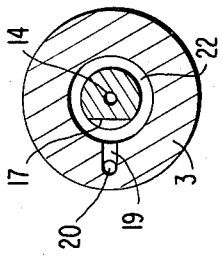

These and other objects, features and advantages of the present invention will become more apparent from the following description when taken in connection with the accompanying drawing which shows, for purposes of illustration only, one embodiment in accordance with the present invention, and wherein:

FIGS. 1 to 5 are longitudinal cross-sectional views through one of the pump elements of a fuel injection pump in accordance with the present invention, whereby the pump piston guided in the pump cylinder is illustrated together with the control slide valve member in different positions thereof; and FIG. 6 is a cross-sectional view through the pump element of a fuel injection pump in accordance with the present invention, taken along line VI—VI of FIG. 4.

Referring now to the drawing, wherein like reference numerals are used throughout the various views to designate like parts, one of the pump elements generally designated by reference numeral 1 of an injection pump, not illustrated in detail, for a compressed air injected internal combustion engines of motor vehicles is illustrated in FIGS. 1 to 5, whereby the number of pump elements corresponds to the number of cylinders of the internal combustion engine.

The pump element 1 essentially consists of a cylinder generally designated by reference numeral 2 which is subdivided into an upper cylinder part 3 and into a lower cylinder part 4, and of a pump piston 5 and of a control slide valve member 6.

The pump piston 5 which is longitudinally displaceably guided within the pump working space 7 only in the lower cylinder part 4 and which is raised by a cam of a drive shaft (not shown), in addition to a longitudinal groove 8, includes laterally a helically shaped milled-out portion or recess 9. The edge at the piston wall which results therefrom is designated as piston control edge 10.

The control slide valve member 6 which is longitudinally displaceably guided in the upper cylinder part 3 rests on this pump piston 5 under the action of a compression spring 11 arranged in the intermediate space 12, which control slide valve member carries out stroke movements in unison with the pump piston 5.

A bore arrangement generally designated by reference numeral 13 is provided in the control slide valve member 6, which consists of a centrally arranged longitudinal bore 14, of a control bore 15 branching off from the longitudinal bore 14 in the upper half of the control slide valve member 6 and extending transversely thereto as well as of a feed bore 16 leading to the longitudinal bore 14 in the lower area of the control slide valve member 6, which is in communication with the pump working space 7. The longitudinal bore 14 terminates in the intermediate space 12.

A flat recess 17 is provided in the lower half of the control slide valve member 6, which extends in the direction of movement thereof; the surface of the recess 17 terminates 18 in end surface which is slightly inclined in the direction of the outer wall and has a concave configuration.

The edge resulting at the outer wall of the control slide valve member 6 is designated as control edge 18 (FIG. 1).

In addition to the bore arrangement 13 in the control slide valve member 6, a bore arrangement is provided in the upper cylinder part 3 which consists of feed bores 19, 20 and 21, of which the bore 19 terminates in an annular groove 22 arranged in the wall of the cylinder part 3, which is being valved by the control bore 15. The bore 21 finally leads into a pump pressure space 23, by way of which fed fuel reaches the injection nozzle via a spring-loaded pressure valve 24 and a pressure line.

The cylinder part 4 includes one or two radial control bores 25 which connect a suction space 26 with the pump working space 7.

OPERATION

The operation of the injection pump according to the present invention is as follows:

A feed pump draws-in fuel out of a fuel tank and forces it into the suction space 26 of the pump element 1. In the lowermost position of the pump piston 5 according to FIG. 1, the pump working space 7, the intermediate space 12 and the pump pressure space 23 is filled with fuel, which reaches the pump working space 7 from the suction space 26 by way of the control bore 25, from there reaches the feed bore 16, the longitudinal bore 14 and then both the intermediate space 12 as also the control bore 15, the annular groove 22 and by way of the bores 19, 20 and 21 finally the pump pressure space 23.

During the upward stroke as a result of the actuation by the cam of the drive shaft, the pump piston 5 closes the control bore 25 (FIG. 2), and simultaneously therewith the connection between the two bore arrangements 14, 15 16 and 19, 20 and 21 in the control slide valve member 6 and in the cylinder part 3, respectively, is interrupted. The pressure in the pump working space 7 and in the intermediate space 12 begins to rise. As soon as the control edge 18 of the control slide valve member 6 which moves along in the upward direction has reached the annular groove 22 in the housing part 3 (FIG. 3), the fuel is displaced into the pressure space 23 in dependence on the pressure by way of the bore arrangement 19, 20 and 21 in the housing part 3, and the spring-loaded pressure valve 24 is lifted. The fuel is then forced by way of the pressure line to the injection nozzle.

As a result of the concavely constructed surface and the adjoining chamfered or rounded-off portion 17 of the control slide valve member 6, a slow increase of the fuel quantity per degree cam angle takes place initially, beginning with the feed commencement. As soon as the bevelled or rounded-off portion 17 is located opposite the annular groove 22, the largest feed quantity per degree cam angle is reached. The feed end is illustrated in FIG. 4 in which the helically shaped control edge 10 of the pump piston 5 intersects the control bore 25 so that the pressure can be relieved in all spaces of the pump element 1.

The pump piston 5 is illustrated in FIG. 5 in its upper dead-center position.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A fuel injection pump for internal combustion engines, the injection pump comprising control slide valve means longitudinally displaceably guided in a pump housing part, a displaceable pump piston means for opening and closing a fuel control bore communicating with a pump working space means and for displacing the control slide valve means, spring means for biasing the control slide valve means, said control slide valve means including first bore means for temporarily connecting the pump working space means with a pump pressure space means, the control slide valve means and the pump piston means being arranged substantially coaxially to each other in a pump cylinder means, characterized in that the control slide valve means rests on the pump means, second bore means provided in the pump housing part in which the control slide valve means is longitudinally displaceably guided for communicating the first bore means with the pump pressure space means in dependence upon a positioning of the control slide valve means, the control slide valve means further including a recess means disposed essentially in a lower half of the control slide valve means for communicating the pump working space means with the second bore means in dependence upon a positioning of the control slide valve means, the recess means extend in a direction of displacement of the control slide valve means and terminates in a surface which is slightly inclined in a direction toward an outer circumference of the control slide valve means, whereby, upon a longitudinal displacement of the control slide valve means by the pump piston means, the working pressure space means is in communication with the pump working space means alternately by either the first bore means or the recess means.

2. A fuel injection pump according to claim 1, characterized in that the control slide valve means rests continuously on the pump piston means.

3. A fuel injection pump according to claim 1, characterized in that the control slide valve means is made in one piece with the pump piston means.

4. A fuel injection pump according to claim 1, characterized in that the recess means is a bevelled portion.

5. A fuel injection pump according to claim 1, characterized in that the recess means is rounded-off.

6. A fuel injection pump according to claim 1, characterized in that the recess means has a concave configuration.

7. A fuel injection pump according to claim 1, characterized in that the pump cylinder means includes an upper cylinder part and a lower cylinder part, the upper cylinder part forms the pump housing part in which the control slide valve means is longitudinally displaceable, and in that the pump piston means is guided only in the lower cylinder part.

8. A fuel injection pump according to claim 7, characterized in that the first bore means includes a longitudinal bore terminating in an intermediate space above the control slide valve means, at least one feed bore communicating with the longitudinal bore and with the pump working space means, and at least one control bore disposed in an upper half of the control slide valve means branching off from the longitudinal bore, and in that the at least one control bore is in communication with the second bore means when the pump piston is in a lower dead-center position.

9. A fuel injection pump according to claim 8, characterized in that the surface of the recess means which is slightly inclined in a direction of an outer circumference of the control slide valve means terminates in a control edge, in that at the latest after a closing of the fuel control bore by the pump piston means a communication between the pump pressure space means and the pump working space means by the first bore means is interrupted, and in that the interruption is communication between the pump pressure space means and the pump working space means continues until the pump piston means displaces the control slide valve means such that the control edge of the recess means reaches the second bore means in the housing part whereupon communication between the pump pressure space means and the pump working space means is resumed by way of the recess means and the second bore means.

10. A fuel injection pump according to claim 1, characterized in that the first bore means includes a longitudinal bore terminating in an intermediate space above the control slide valve means, at least one feed bore communicating with the longitudinal bore and with the pump working space means, and at least one control bore disposed in an upper half of the control slide valve means branching off from the longitudinal bore, and in that the at least one control bore is in communication with the second bore means when the pump piston means is in a lower dead-center position.

11. A fuel injection pump according to claim 10, characterized in that the surface of the recess means which is slightly inclined in a direction of an outer circumference of the control slide valve means terminates in a control edge, in that at the latest after a closing of the fuel control bore by the pump piston means a communication between the pump pressure space means and the pump working space means by the first bore means is interrupted, and in that the interruption in communication between the pump pressure space means and the pump working space means continues until the pump piston means displaces the control slide valve means such that the control edge of the recess means reaches the second bore means in the housing part whereupon communication between the pump pressure space means and the pump working space means is resumed by way of the recess means and the second bore means.

12. A fuel injection pump according to claim 11, characterized in that the recess means has a concave configuration.

13. A fuel injection pump according to claim 11, characterized in that the recess means is rounded-off.

14. A fuel injection pump according to claim 11, characterized in that the second bore means includes at least one additional feed bore, the at least one additional feed bore terminating in an annular groove disposed in the housing part in which the control slide valve means is longitudinally displaceable, the at least one feed bore of the first bore means being brought into communication with the annular groove in dependence upon a position of the control slide valve means.

15. A fuel injection pump according to claim 11, characterized in that the pump piston means is provided with a longitudinally extending groove means and a helically shaped recess means defining a helical control edge cooperable with the fuel control bore so as to relieve all pressures in the pump working space means and pump pressure space means upon the pump means reaching a predetermined position.

16. A fuel injection pump according to claim 15, characterized in that the pump cylinder means includes an upper cylinder part and a lower cylinder part, the upper cylinder part forms the pump housing part in which the control slide valve means is longitudinally displaceable, and in that the pump piston means is guided only in the lower cylinder part.

* * * * *